(12) United States Patent
Liu et al.

(10) Patent No.: US 11,608,641 B2
(45) Date of Patent: Mar. 21, 2023

(54) ENERGY-EFFICIENT ASSISTIVE STAIRS

(71) Applicants: Georgia Tech Research Corporation, Atlanta, GA (US); Emory University, Atlanta, GA (US)

(72) Inventors: Cheng-Yun Karen Liu, Atlanta, GA (US); Sehoon Ha, Atlanta, GA (US); Yun Seong Song, Atlanta, GA (US); Lena Ting, Atlanta, GA (US)

(73) Assignees: Georgia Tech Research Corporation, Atlanta, GA (US); Emory University, Atlanta, GA (US)

( * ) Notice: Subject to any disclaimer, the term of this patent is extended or adjusted under 35 U.S.C. 154(b) by 0 days.

(21) Appl. No.: 17/228,854

(22) Filed: Apr. 13, 2021

(65) Prior Publication Data
US 2021/0277661 A1    Sep. 9, 2021

Related U.S. Application Data

(62) Division of application No. 16/617,050, filed as application No. PCT/US2018/034047 on May 23, 2018, now Pat. No. 10,975,574.
(Continued)

(51) Int. Cl.
*E04F 11/00* (2006.01)
*E04F 11/104* (2006.01)
*B66B 9/08* (2006.01)

(52) U.S. Cl.
CPC .......... *E04F 11/104* (2013.01); *B66B 9/0869* (2013.01); *E04F 2011/1046* (2013.01)

(58) Field of Classification Search
CPC .............. E04F 11/1041; E04F 11/1863; E04F 11/0255; E04F 11/066; B66B 9/0869; B66F 7/065
(Continued)

(56) References Cited

U.S. PATENT DOCUMENTS 3,880,259 A * 4/1975 Richards ................ B66F 7/065
                                                    187/269
4,558,648 A * 12/1985 Franklin ................. B66F 7/065
                                                    108/136
(Continued)

FOREIGN PATENT DOCUMENTS

CN        1072184 C   ‡ 10/2001
CN        201517687 U ‡ 10/2016
(Continued)

OTHER PUBLICATIONS

ESPACENET: "Bibliographic data: KR20120101774 (A)"; Sep. 17, 2012.‡
(Continued)

*Primary Examiner* — Kyle J. Walraed-Sullivan
(74) *Attorney, Agent, or Firm* — Bryan W. Bockhop; Bockhop Intellectual Property Law, LLC

(57) ABSTRACT

In a method for recycling energy from stairs, a step platform is moveable between an upper and lower position. An energy storage device, coupled to the platform, stores energy when a downward force is applied thereto, causing the step platform to move to the lower position. The energy storage device (also releases stored energy as the step platform moves from to the upper position. A controllable locking mechanism (locks the step platform in the lower position when the downward force has caused the step platform to move into the lower position. A sensor determines when a downward force has been applied to the next higher step platform. A controller signals the controllable locking mechanism to unlock the step platform when the step platform is in the lower position, and when the downward force has been applied to the next higher step platform.

13 Claims, 3 Drawing Sheets

Related U.S. Application Data

(60) Provisional application No. 62/591,969, filed on Nov. 29, 2017, provisional application No. 62/511,453, filed on May 26, 2017.

(58) Field of Classification Search
USPC .......................................... 52/182, 183, 184
See application file for complete search history.

(56) References Cited

U.S. PATENT DOCUMENTS

| | | | | |
|---|---|---|---|---|
| 4,662,809 A * | 5/1987 | Sturtz | ................... | B65G 69/24 |
| | | | | 414/347 |
| 4,690,250 A * | 9/1987 | Bergstrom | ................ | B66F 7/08 |
| | | | | 182/141 |
| 4,712,653 A * | 12/1987 | Franklin | ................... | B66F 7/08 |
| | | | | 108/145 |
| 4,741,414 A * | 5/1988 | Claassen | ................... | B66F 7/08 |
| | | | | 187/240 |
| 4,930,277 A * | 6/1990 | Krumholz | ................. | E04H 3/24 |
| | | | | 52/182 |
| 5,802,773 A * | 9/1998 | Pingel | ....................... | E04H 3/26 |
| | | | | 52/10 |
| 7,131,522 B2 ‡ | 11/2006 | Sircovich | ............. | B66B 9/0869 |
| | | | | 198/322 |
| 7,185,741 B1 * | 3/2007 | Rozenfeld | ............. | B66B 9/0869 |
| | | | | 187/200 |
| 7,234,565 B1 * | 6/2007 | Lam | ...................... | B66B 9/0869 |
| | | | | 182/141 |
| 2004/0069979 A1 * | 4/2004 | Hicks | ................... | B66F 7/0608 |
| | | | | 254/122 |
| 2005/0241247 A1 * | 11/2005 | Sircovich | ............. | B66B 9/0869 |
| | | | | 52/183 |
| 2005/0269757 A1 * | 12/2005 | Stevenson | ............. | B25B 1/2421 |
| | | | | 269/266 |
| 2006/0180401 A1 * | 8/2006 | Bourgeois | ............. | B66B 9/0861 |
| | | | | 187/250 |
| 2008/0169158 A1 ‡ | 7/2008 | Lam | ......................... | B66F 7/14 |
| | | | | 187/211 |
| 2010/0176944 A1 * | 7/2010 | Shell | .................... | B66B 9/0869 |
| | | | | 340/541 |
| 2011/0127113 A1 * | 6/2011 | Vanderburgh | ........ | B66B 9/0869 |
| | | | | 187/200 |
| 2013/0168189 A1 * | 7/2013 | Ribas | ................... | B66B 9/0869 |
| | | | | 187/200 |
| 2013/0213744 A1 * | 8/2013 | Foley | ........................ | B66F 9/24 |
| | | | | 187/276 |
| 2016/0060084 A1 * | 3/2016 | Baudermann | ........... | B66F 7/065 |
| | | | | 414/347 |
| 2018/0070732 A1 * | 3/2018 | Pillay | ................... | A61G 7/1013 |
| 2019/0308847 A1 * | 10/2019 | Teglia | ................... | B66B 9/0869 |

FOREIGN PATENT DOCUMENTS

| | | | | |
|---|---|---|---|---|
| CN | 105565113 A | ‡ | 11/2016 | |
| FR | 2 536 731 | ‡ | 6/1984 | |
| KR | 10-2012-0101774 | ‡ | 9/2012 | |
| WO | WO 98/31627 A1 | ‡ | 7/1998 | ........... B66B 9/0869 |

OTHER PUBLICATIONS

Madhan et al.: "Design and Implementation of Small Wind and Stair Climbing Power Generation System"; 2015; International Conference on Inter Disciplinary Research in Engineering and Technology.‡
WIPO: "Notification of Transmittal of the International Search Report and the Written Opinion of the International Searching Authority, or the Declaration"; dated Jul. 26, 2018—related PCT case Serial No. PCT/US2018/034047.‡
ESPACENET: "Bibliographic data: JP2001080889 (A)"; Mar. 27, 2001.‡
ESPACENET: "Bibliographic data: JP2007146635 (A)"; Jun. 14, 2007.‡
ESPACENET: "Bibliographic data: CN2646271 (Y)"; Oct. 6, 2004.‡

\* cited by examiner
‡ imported from a related application

ENERGY-EFFICIENT ASSISTIVE STAIRS

CROSS-REFERENCE TO RELATED APPLICATION(S)

This application is a divisional of U.S. patent application Ser. No. 16/617,050 filed on Nov. 12, 2019, which claims the benefit of U.S. Provisional Patent Application Ser. No. 62/511,453, filed May 26, 2017, and U.S. Provisional Patent Application Ser. No. 62/591,969, filed Nov. 29, 2017, the entirety of each of which is hereby incorporated herein by reference.

This application claims the benefit of Patent Cooperation Treaty Application Serial No. PCT/US18/34047, filed May 23, 2018, the entirety of each of which is hereby incorporated herein by reference.

STATEMENT OF GOVERNMENT INTEREST

This invention was made with government support under agreement No. EFRI1137229, awarded by the National Science Foundation. The government has certain rights in the invention.

BACKGROUND OF THE INVENTION

1. Field of the Invention

The present invention relates to stair negotiation assistive technologies and, more specifically, to an assistive technology that recycles energy during stair negotiation.

2. Description of the Related Art

Stair negotiation can be a demanding task that limits the independence of individuals with mobility impairments such as muscle weakness, joint pain, or reduced sensorimotor control. Joint moments in the knee are over three times greater during stair negotiation compared to level walking during both stair ascent and descent. Stair negotiation is ranked among the top five most difficult tasks in community-residing older adults. Patients—such as those with hip osteoarthritis—sometimes adopt altered joint movements to reduce pain during stair negotiation. Moreover, even if they are capable of using stairs, people with mobility impairments often avoid stair negotiation.

Current solutions providing assistance in stair negotiation are costly, energy-consuming, and do not help to retain the user's ability to negotiate stairs independently. Elevators or stair-lifts are often impractical to install because they consume substantial amounts of energy, sometimes as much as 50% of the average household energy consumption in the United States in 2009.

Perhaps more importantly, elevators or stair-lifts replace the need to negotiate stairs altogether, regardless of a user's level of motor function. Because studies suggest that disuse of a specific motor function can further accelerate its loss, it is important to provide motor assistance that allows users to retain their ability to use stairs and to prevent further motor decline.

Therefore, there is a need for an assistive technology for stair negotiation that recycles energy.

SUMMARY OF THE INVENTION

The disadvantages of the prior art are overcome by the present invention which, in one aspect, is a mechanism for recycling energy from stairs that includes a step platform moveable between an upper position and a lower position. An energy storage device is coupled to the step platform and is configured to store energy when a downward force is applied, to the step platform causing the step platform to move from the upper position to the lower position. The energy storage device is also configured to release stored energy as the step platform moves from the lower position to the upper position. A controllable locking mechanism is configured to lock the step platform in the lower position when the downward force has caused the step platform to move into the lower position. A sensor is configured to determine when a downward force has been applied to the step platform. A controller is configured to signal the controllable locking mechanism to unlock the step platform when the step platform is in the lower position and when the sensor indicates that a downward force has been applied to the next-higher step platform by the user during stair ascent.

In another aspect, the invention is a staircase for use by a user that includes a plurality of steps. An energy storage system is disposed on each of the plurality of steps and is configured to store energy received from the user as the user descends the staircase and is configured to apply an upward force to the user when ascends the staircase. A controller controls the energy storage system.

In yet another aspect, the invention is a method of assisting a user of stairs, in which energy is stored when a user applies downward force to a step platform while descending the stairs. The stored energy is released so as to apply an upward force to the user as the user ascends the stairs.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figures 1A, 1B, 1C:
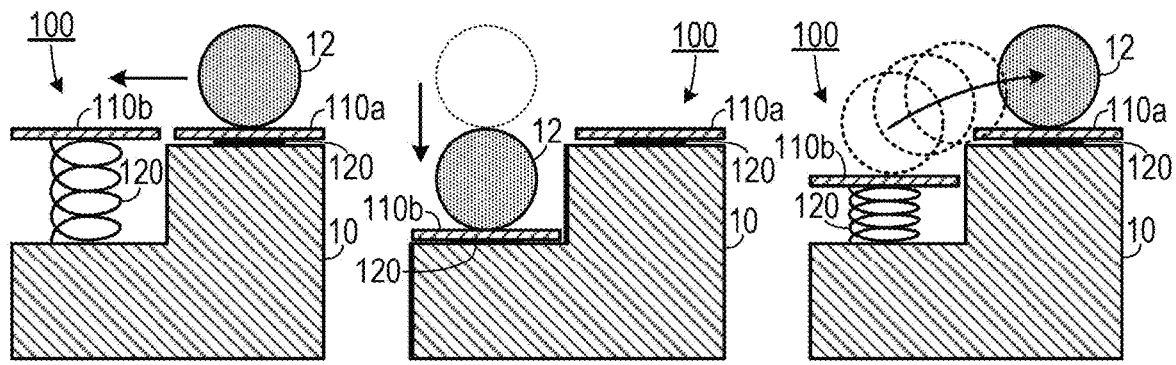
FIGS. 1A-1C, are a series of schematic diagrams show operation of one embodiment of the invention.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one representative embodiment of a mechanism 100 for recycling energy from stairs 10, employs a step platform 110a and 110b coupled to each of the stairs 10 with an energy storage device 120. The step platform 110a and 110b is moveable between an upper position (as shown in FIG. 1A) and a lower position (as shown in FIG. 1B). When an object 12 (such as a person) moves onto the platform 110a and 110b while it is in the upper position and applies a downward force thereto (as shown by the arrow in FIG. 1B), the energy storage device 120 acquires and stores potential energy as a result of downward movement of the platform 110a and 110b. When the object 12 ascends the stairs 10, the energy storage device 120 releases energy to the platform 110a and 110B, which imparts an upward force on the object 12.

Figures 2A, 2B:
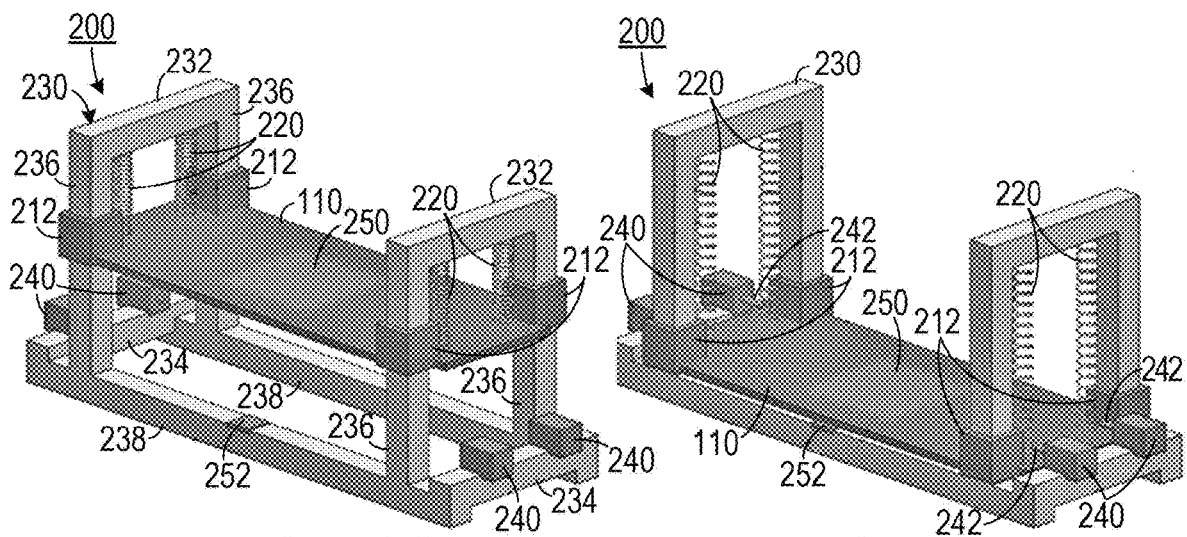
FIGS. 2A-2B are perspective views of one embodiment of an energy harvesting system for stairs.
Figure 3:
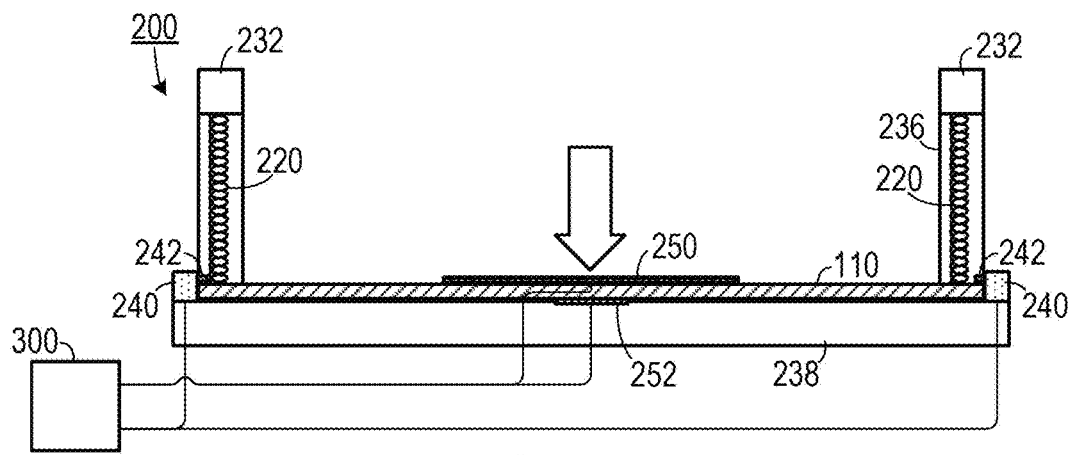
FIG. 3 is a schematic diagram of the embodiment show in FIG. 2B.

As shown in FIGS. 2A, 2B and 3, one experimental embodiment of an energy recycling mechanism is a unit 200 that can be affixed to the stairs of an existing staircase. A plurality of such units 200 can be affixed to a corresponding plurality of stairs in a staircase. In this embodiment, the unit 200 uses four springs 220 as energy storage devices. The unit employs a frame 230 that guides the step platform 110 between the lower position to the upper position. The springs 220 couple the step platform 110 to the frame 230. The frame includes first and second horizontal members 238 and first a second transverse members 234 that are transverse and affixed to the horizontal members 238. Two inverted U-shaped members 232 extend upwardly from the horizontal members 238 and the springs 220 are coupled to the tops lateral portions of the U-shaped members 232 and to the platform 110. The U-shaped members 232 include vertical legs 236 that support guide bearings 212 affixed to the platform 110

While this embodiment employs springs 220 as energy storage devices, many other energy storage devices could be used, depending on the specific application. For example, pneumatic energy storage devices and hydraulic energy storage devices could be employed in certain embodiments. In one embodiment, energy recycling can be accomplished by generating an electrical current as a result of the lowering of the platform 110 (e.g., with a generator affixed to the platform 110) and the resulting electrical energy can be stored in a battery or a capacitor. The electrical energy can then be subsequently transferred to an electric motor that can be used to apply upward force to the platform 110. A motor system (e.g., a motor/ratchet combination) can be used to preset the step units for situations in which a first user ascends the steps and a second user also ascends prior to any user descending. Similarly, the steps can be preset when two subsequent users descend the steps without anyone ascending between descents.

Controllable locking mechanisms are affixed to the transverse members 234 and hold the platform 110 in a locked position (as shown in FIG. 2B) when the platform 110 is forced into the lower position, which keeps the potential energy acquired during a descent stored by the springs 220 and releases it when a user ascends the stairs. In one embodiment, the locking mechanisms include solenoids 240 that are affixed to the transverse members. The solenoids 240 have retractable arms 242 that are extended to secure the platform 110 in the locked position and that are retracted to release the platform 110 and allow it to move upwardly. In other embodiments, the controllable locking mechanisms could include, for example, electro-magnets and one of the many locking devices known in the art.

In one embodiment, controllable locking mechanisms can also be placed so as to be able to lock the platform 110 in the fully upper position. When locked in this position, the stairs can be used as ordinary, non-energy recycling stairs.

A first sensor 250 and a second sensor 252 sense when a user steps onto the step platform 110. In one embodiment, sensor 250 and sensor 252 include pressure sensors. In other embodiments, the sensors could include optical sensors, capacitive sensors, or any sensors capable of detecting the user's stepping on the step platform 110, In certain embodiments, the sensors could be of a type that can identify individual users (e.g., biometric sensors), the information from which can be used to customize the system for specific users.

A controller 300 senses output from sensor 250 and sensor 252 and controls the state of the solenoids 240, based on a stored last state of the platform 110 and a current state of sensor 250 and sensor 252. For example, referring to FIG. 3 and FIGS. 1A-1C, if platform 110b is in the locked lower position and if sensors 250 and 252 sense pressure corresponding to a user stepping onto the platform 110a, the controller 300 will issue a signal causing the solenoids 240 to retract the arms and release platform 110b. Similarly, if the last recorded state of platform 110b is in the fully upper position and if sensor 250 indicates that a user has stepped onto platform 110b, then the controller 300 will cause the solenoids 240 to extend the arms to engage platform 110 once sensor 252 indicates that the platform 110b has reached its fully lower position.

Figure 4A:
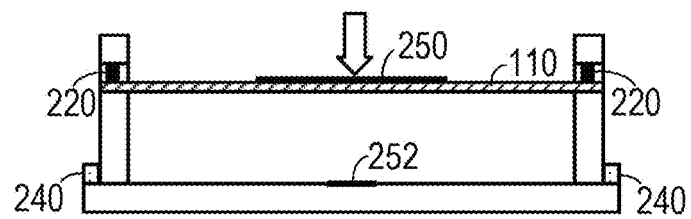
FIGS. 4A-4F are a series of schematic diagrams showing operation of the embodiment shown in FIG. 3.
Figure 4B:
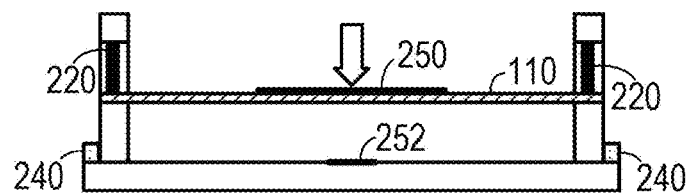
Figure 4C:
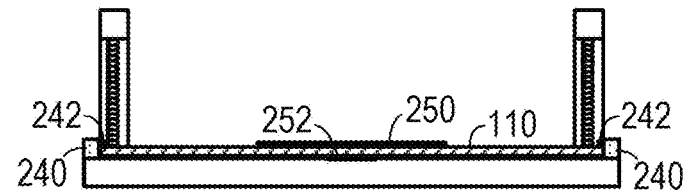
Figure 4D:
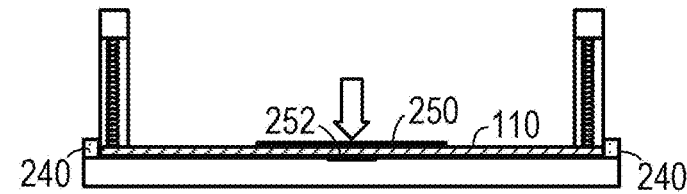
Figure 4E:
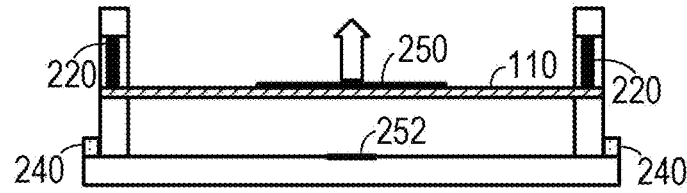
Figure 4F:
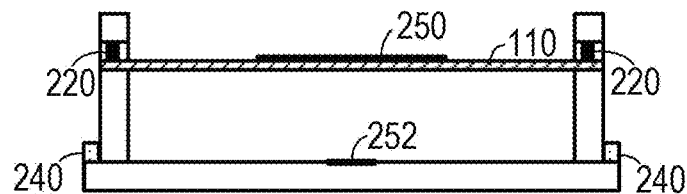

Use of this embodiment is shown in FIGS. 4A-4F. In FIG. 4A, a force (as shown by the downward arrow) is applied to the platform 110 by a user, causing the platform 110 to move downwardly, as shown in FIG. 4B. Once the platform 110 is fully down, as shown in FIG. 4C, the solenoids 240 extend their arms 242 to engage the platform 110, thereby locking it in the lower position. As shown in FIG. 4D, when a force (as shown by the downward arrow) is applied to sensor 250, the controller disengages solenoids 240 from the platform 110, which rises as energy from the springs 220 causes an upward force (as shown by the upward arrow) to user, as shown in FIG. 4E. Once the user steps off of the platform 110, as shown in FIG. 4F, the device is in position awaiting the next descent.

Figure 5A:
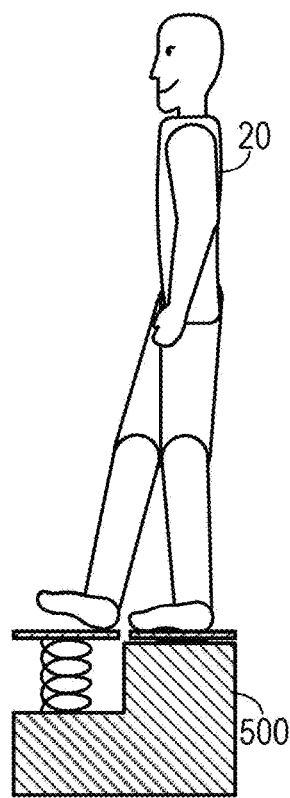
FIGS. 5A-5F are a series of schematic diagrams showing a user ascending and descending a staircase employing an energy harvesting system.
Figure 5B:
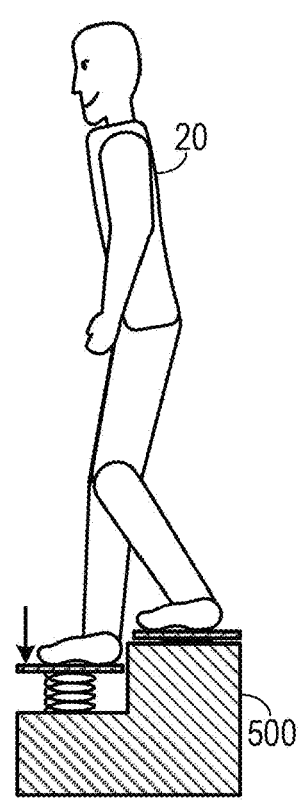
Figure 5C:
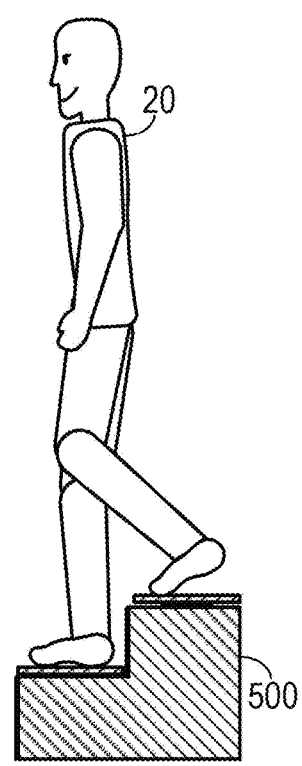
Figure 5D:
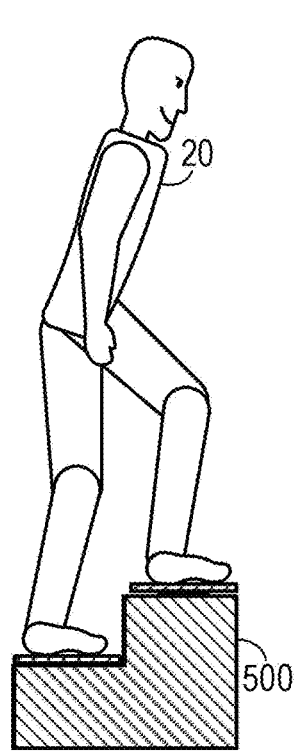
Figure 5E:
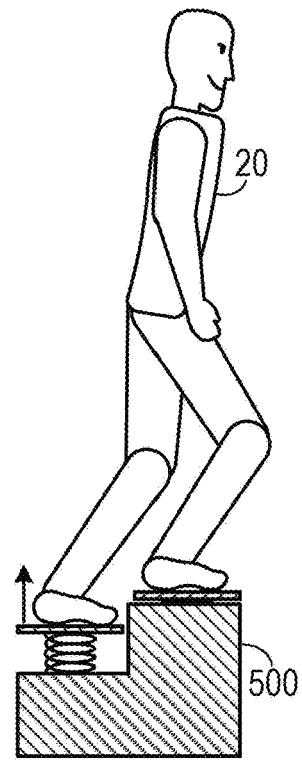
Figure 5F:
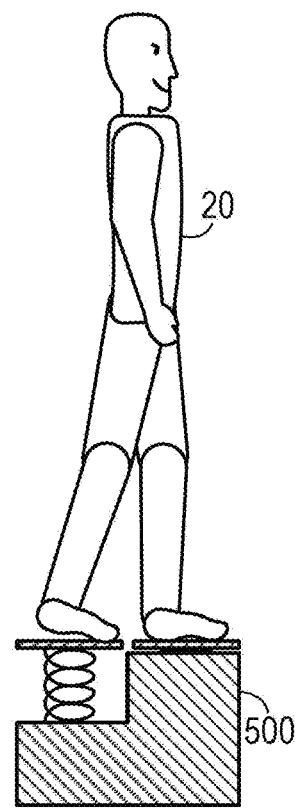

Descent by a user 10 is shown in FIGS. 5A-5C, in which a retrofitted staircase 500 includes enemy recycling units. Ascent is shown in FIGS. 5D-5F.

In one embodiment, the controller 300 is configured to identify specific users or specific user characteristics (e.g., weight), based on sensor input, and to adjust behavior of the system so as to accommodate specific users. For example, the system could selectively disengage one or more springs from the platform when a lighter user is using the stairs and to reengage the springs when heavier users use the stairs.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of assisting a user of stairs, comprising the steps of:

(a) storing energy as a result of the user stepping onto a step platform thereby applying a downward force to the step platform as the user descends the stairs, by executing the steps of;
 (i) receiving the downward force with the step platform that is coupled to an energy storage device so that as the step platform moves downwardly in response to the downward force, the energy storage device stores the energy; and
 (ii) locking the step platform in a position after the user has forced the step platform to a down-most position, wherein locking the step platform comprises moving arms of at least two solenoids disposed on opposite sides of the step platform from a retracted position to an extended position, in which the arms of the at least two solenoids engage the step platform to lock the step platform in the down-most position so as to prevent upward movement of the step platform; and
(b) releasing the stored energy so as to apply an upward force to the user as the user ascends the stairs, by executing the steps of:
 (i) sensing that the user has applied a force to the step platform after the step platform has been locked in the down-most position; and
 (ii) unlocking the step platform as a result of the user applying the force to the step platform, thereby releasing the stored energy to the step platform.

2. The method of claim 1, wherein the step of storing energy comprises the step of storing the energy in a spring that is coupled to the step platform onto which the user steps.

3. The method of claim 1, wherein in the step of unlocking the step platform comprises generating a signal that causes the arms of the at least two solenoids to to move from the extended position to the retracted position, in which the retracted position allows upward movement of the step platform.

4. The method of claim 3, wherein the step of applying an upward force from the energy storage device to the step platform comprises releasing energy from a spring to the step platform as a result of placing the arms of the at least two solenoids in the retracted position.

5. A method of assisting a user of stairs, comprising the steps of:
(a) storing energy as a result of the user stepping onto a step platform thereby applying a downward force to the step platform as the user descends the stairs, wherein the step platform is coupled to an energy storage device so that as the step platform moves downwardly in response to the downward force, the energy storage device stores the energy;
(b) locking the step platform in a position after the user has forced the step platform to a down-most position, wherein locking the step platform comprises moving arms of at least two solenoids disposed on opposite sides of the step platform from a retracted position to an extended position, in which the arms of the at least two solenoids engage the step platform to lock the step platform in the down-most position so as to prevent upward movement of the step platform; and
(c) releasing the stored energy so as to apply an upward force to the user as the user ascends the stairs.

6. The method of claim 5, wherein the step of releasing the stored energy comprises:
(a) sensing that the user has applied a force to the step platform after the step platform has been is locked in the down-most position;
(b) unlocking the step platform as a result of the user applying the force to the step platform; and
(c) applying an upward force from the energy storage device to the step platform, so as to apply the upward force to the user, as the step platform moves from the down-most position to an up-most position.

7. The method of claim 5, wherein the step of storing energy comprises the step of storing the energy in a spring that is coupled to the step platform onto which the user steps.

8. The method of claim 5, wherein in the step of unlocking the step platform comprises generating a signal that causes the arms of the at least two solenoids to move from the extended position to the retracted position, in which the retracted position allows upward movement of the step platform.

9. The method of claim 8, wherein the step of applying an upward force from the energy storage device to the step platform comprises releasing energy from a spring to the step platform as a result of placing the arms of the at least two solenoids in the retracted position.

10. A method of assisting a user of stairs, comprising the steps of:
(a) storing energy as a result of the user stepping onto a step platform thereby applying a downward force to the step platform as the user descends the stairs, wherein the step platform is coupled to an energy storage device so that as the step platform moves downwardly in response to the downward force, the energy storage device stores the energy;
(b) locking the step platform in a position after the user has forced the step platform to a down-most position, wherein locking the step platform comprises moving arms of at least two solenoids disposed on opposite sides of the step platform from a retracted position to an extended position, in which the arms of the at least two solenoids engage the step platform to lock the step platform in the down-most position so as to prevent upward movement of the step platform; and
(c) releasing the stored energy so as to apply an upward force to the user as the user ascends the stairs, wherein the step of releasing the stored energy comprises:
 (i) sensing that the user has applied a force to the step platform after the step platform is locked in the down-most position;
 (ii) unlocking the step platform as a result of the user applying the force to the step platform; and
 (iii) applying an upward force from the energy storage device to the step platform, so as to apply the upward force to the user, as the step platform moves from the down-most position to an up-most position.

11. The method of claim 10, wherein the step of storing energy comprises the step of storing the energy in a spring that is coupled to the step platform onto which the user steps.

12. The method of claim 10 wherein in the step of unlocking the step platform comprises generating a signal that causes the arms of the at least two solenoids to move from the extended position to the retracted position, in which the retracted position allows upward movement of the step platform.

13. The method of claim 12, wherein the step of applying an upward force from the energy storage device to the step platform comprises releasing energy from a spring to the step platform as a result of placing the arms of the at least two solenoids in the retracted position.

* * * * *